United States Patent [19]

Menager

[11] 4,354,097

[45] Oct. 12, 1982

[54] ODOMETERS

[75] Inventor: Jean Menager, Luxembourg, Luxembourg

[73] Assignee: Societe Internationale de Mecanique Industrielle S.A., Luxembourg, Luxembourg

[21] Appl. No.: 57,889

[22] Filed: Jul. 16, 1979

[30] Foreign Application Priority Data

Jul. 20, 1978 [FR] France ................ 78 21522
Dec. 8, 1978 [FR] France ................ 78 34701

[51] Int. Cl.³ .......................................... G01C 22/00
[52] U.S. Cl. ........................................ 235/96; 235/97
[58] Field of Search .......... 235/1 C, 1 D, 95 R–95 B, 235/96, 97, 117 R, 130 R, 133 R

[56] References Cited

U.S. PATENT DOCUMENTS

| | | | |
|---|---|---|---|
| 2,046,163 | 6/1936 | Helgeby | 235/96 |
| 3,337,129 | 8/1967 | Johnson | 235/117 R |
| 3,495,773 | 2/1970 | Hachtel | 235/96 |
| 3,580,497 | 5/1971 | Powell | 235/96 |
| 4,204,112 | 5/1980 | Lane | 235/133 R X |

Primary Examiner—L. T. Hix
Assistant Examiner—Benjamin R. Fuller
Attorney, Agent, or Firm—Jacobs & Jacobs

[57] ABSTRACT

An odometer for displaying the speed of a vehicle and the distance travelled, comprising an input shaft driven at a speed proportional to that of the vehicle, a speedometer unit connected to the input shaft, a mileage recording unit comprising a plurality of graduated drums mounted side by side on a common shaft and driven from the input shaft, a plurality of radially projecting stop lugs, and a frame for supporting said unit in rotation, the frame comprising two parallel walls provided with recesses for receiving the respective ends of the shaft of the mileage recording unit.

The frame comprises a bar extending between said walls parallel to said common shaft and providing stop means for the projecting stop lugs. There is associated with the bar a locking element for immobilizing the stop lugs in their stop position, which element is force-fitted in recesses formed in the walls of the frame substantially in the plane of the bar.

5 Claims, 4 Drawing Figures

ODOMETERS

The present invention relates to an odometer for displaying the speed of a vehicle and the distance travelled, and comprising an input shaft driven at a speed proportional to that of the vehicle, a speedometer unit connected to the input shaft and a mileage recording unit including a plurality of graduated drums mounted side by side on a common shaft and driven from the input shaft.

In odometers of this type, the mileage recording unit is supported in rotation in a frame which comprises two parallel walls provided with recesses for accommodating the ends of the shaft of the drums. The mileage recording unit comprises elements disposed internally of the drums, which must be restrained against rotation and which are provided with stop lugs projecting from the drums.

Respective recesses are conventionally formed in the frame for receiving the stop lugs. The assembling step consisting in introducing the pins in their recesses is delicate, as it implies that all the lugs have been correctly positioned. It must therefore be carried out by hand.

The object of the invention is to provide an odometer of the type indicated above, in which the assembling of the mileage recording unit is much simplified and may be effected by an automatic machine.

To this end, according to the invention, the frame comprises a bar extending between said walls parallel to the shaft of the drums thereby to provide a stop for the projecting lugs, and a locking element is associated with the bar for immobilizing the stop lugs in the stop position defined by said bar, which element is force-fitted in recesses formed in said walls of the frame substantially in the plane of the bar.

It is then very simple to assemble the mileage recording unit. When the ends of the shaft of the drums are fitted in the corresponding recesses of the frame, all the projecting lugs abut on the bar. It then suffices to position the locking rod to immobilize all the lugs in the suitable angular position. Assuming the frame to be fixed, these two positioning operations consist in moving successively the mileage recording unit and the locking rod in translation, i.e., maintaining them parallel to themselves during their movement. These are operations which are easy to automatize.

If it is desired that the odometer comprises a trip-dial unit, a unit having the same structure as the mileage recording unit may be used, of which the immobilization will be achieved in the same way by a locking element which maintains the stop lugs of the trip-dial unit in abutment against a second bar provided in the frame.

The invention also provides a modified embodiment in which, in the trip-dial unit, the drums are driven by gears disposed outside the drums and therefore stop lugs are not provided.

In this embodiment, the odometer comprises a trip-dial unit which comprises a plurality of drums mounted side by side in a chassis, a line of outer gears pivotally mounted with respect to the chassis, for rotating drums, the chassis being provided with recesses for receiving the journals provided at both ends of the line of drums, the chassis further bearing at least one member force-fitted in recesses formed in the walls of the frame, said journals being also received in recesses formed in said walls.

According to an advantageous feature, the recesses formed in the chassis for receiving the journals are oriented perpendicularly to those formed in the frame.

The frame and the chassis preferably comprise means which cooperate to provide centering of the chassis.

The invention will be more readily understood on reading the following description with reference to the accompanying drawings, in which.

Figure 1:
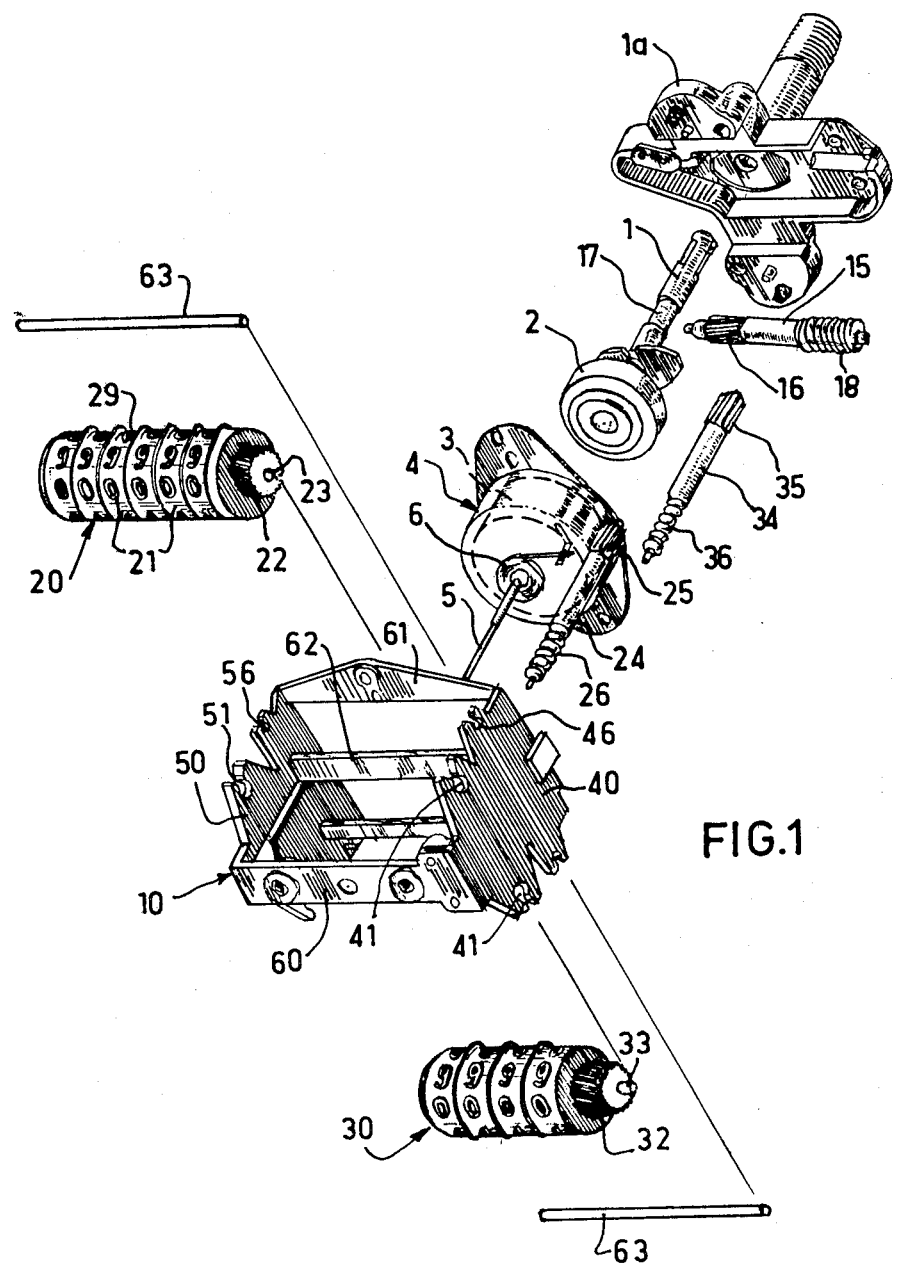
FIG. 1 is an exploded view in perspective of the odometer according to the invention, in a first embodiment.

Referring now to the drawings, FIG. 1 shows an odometer which comprises a flexible drive shaft (not shown here), which rotates at a speed proportional to the speed of the vehicle to which the odometer is attached, a speedometer unit for displaying the speed of the vehicle and a mileage recording mechanism for displaying the distance travelled by the vehicle.

The speedometer unit is a device functioning by eddy currents and is composed of an input shaft 1 rotatable with the above-mentioned flexible shaft, a register body 1a, a magnet 2 fixed on the shaft 1, an induced ring 3, a field closing member 4, a shaft 5 rotatable with the ring 3 and passing through member 4, and which drives the needle of the speedometer (not shown here) and of a coiled spring 7 mounted on a flange 6 secured to the shaft 5.

Figure 2:
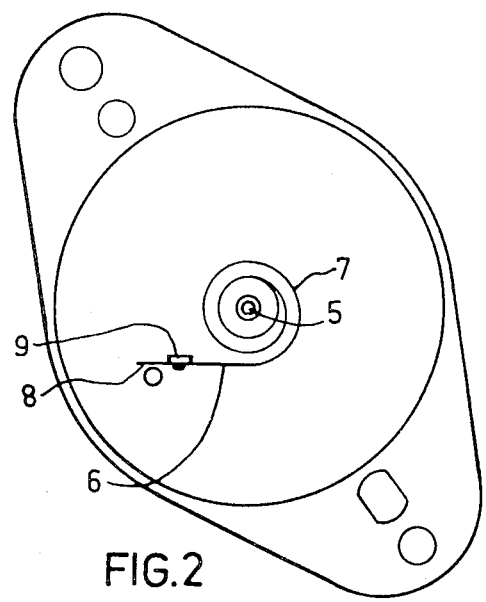
FIG. 2 is a view, on a larger scale, of an element of the odometer of FIG. 1.

The function of the coiled spring 7 which is more clearly seen in FIG. 2, is to exert a return force which opposes the movement of the ring 3. The coiled spring 7 functions in unwinding mode, i.e. its turns are normally close-wound and move apart from one another in operation. Functioning in unwinding mode presents the following advantages over the conventional functioning in torsion mode, where the normally spaced apart turns become close-wound in operation.

In the torsion mode, there is the risk that the turns come into mutual engagement on coming closer together, thus altering the return force and may falsify the displayed indications. This risk does not exist in the unwinding mode, since the turns move away from a close-wound position.

Moreover, it is a delicate operation to assemble a coiled spring functioning in torsion mode. This requires considerable manual skill, as the turns must be in suitably spaced apart relationship. On the contrary, a spiral spring functioning in unwinding mode is very simple to assemble, as shown in FIG. 2. It suffices to mount the close-wound coiled spring 7 around the flange 6 and to cause the end 8 of the spring to rest against a stop lug 9 and to weld it thereon, for example by induction.

Figure 3:
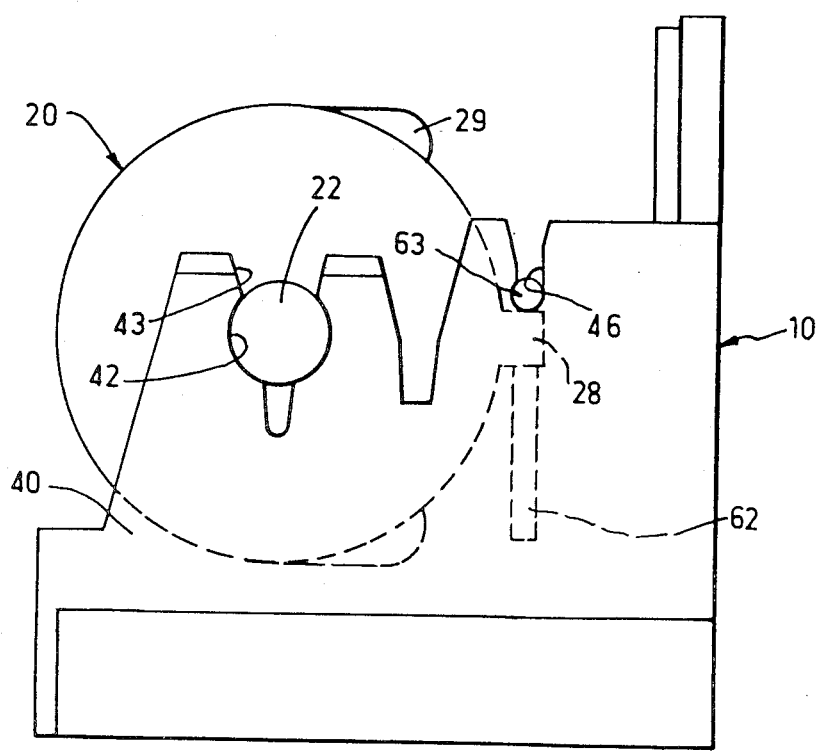
FIG. 3 is a schematic view, on a larger scale, of the mileage recording mechanism, in an assembled state, only half of which has been shown.

Referring again to FIG. 1 and to FIG. 3, the mileage recording assembly essentially comprises a frame, generally designated 10, a mileage recording unit 20, a trip-dial unit 30, the latter being able to be omitted, and a transmission assembly to allow the units 20 and 30 to be driven from the input shaft 1.

The transmission unit comprises a primary shaft 15 provided with a gearing 16 which meshes with a gearing 17 formed on the input shaft 1, and two secondry shafts 24 and 34. The secondary shaft 24 comprises at one end a gearing 25 which meshes with a gearing 18 formed on the primary shaft 15, and at the other end a gearing 26 in mesh with a gear 22 mounted at the end of the unit 20. Similarly, the secondary shaft 34 comprises a gearing 35 in mesh with the gearing 18 and a gearing 36 in mesh with a gear 32 mounted at the end of the unit 30.

The mileage recording unit 20 conventionally comprises a plurality of drums 21, graduated from 0 to 9, disposed side by side about a shaft. The drums are driven from the gear 22, the arrangement being such that each drum rotates by one graduation when the preceding disc (with respect to gear 22) makes a complete revolution.

The unit 30 has an identical structure, with gear 32 for driving the drums. The shaft of unit 20 (or 30, respectively) has projecting ends, the projecting end from gear 22 (or 32 respectively), which is the only one shown in FIG. 1, being referenced 23 (or 33 respectively).

The frame 10 is a molded body of plastics material which comprises two parallel end walls 40, 50 and transverse elements such as 60, 61 which connect the walls 40, 50. The spacing between the walls 40 and 50 is such that the units 20 and 30 may be received between the walls 40 and 50.

On the other hand, FIG. 3 shows that each unit conventionally comprises stop lugs 28 which project from the peripheral surface of the unit between two adjacent drums. The lugs 28 constitute the visible extensions of inner elements which carry the inner gears conventionally provided for driving the drums and which, in operation, must remain fixed in rotation. These inner elements are also visible by lugs 29 acting to facilitate the angular positioning of the units on assembly.

For positioning the mileage recording unit 20, the end walls 40 and 50 comprise opposite recesses 41, 51 which are shaped to receive, by force fit, the respective ends of the shaft of the drums of units 20 and 30.

FIG. 3 shows the shape of the recess 41 in greater detail; it comprises a circular opening 42 adapted to the diameter of the shaft of the drums, and a narrower notch 43 which the shaft must force in order to penetrate in the circular opening 42.

There is also provided, for each unit, a transverse bar 62 which forms a stop for the stop lugs 28 of a unit. In the plane of this bar are formed opposite recesses 46, 56 of the same type as recesses 41, 51, but smaller, which are shaped to receive, by force fit, a locking rod 63. The stop lugs 28 are thus immobilized in the suitable position between the bar 62 and the locking rod 63.

It is clear that the positioning of the units 20 and 30 is extremely simple and may be automatized. Due to the presence of the bar 62, the stop lugs 28 automatically take the correct position when the unit 20 is introduced in the frame 10, and the assembly of the locking rod 63 then fixes the lugs in this position.

It has been indicated hereinabove that the trip-dial unit 30 could be omitted. In this case, the corresponding elements, and particularly the secondry shaft 34, will also be absent.

The device for resetting the trip-dial unit 30 has not been described here, as it may have any known structure provided it enables the shaft on which the drums of the unit 30 are mounted to rotate by one revolution.

Figure 4:
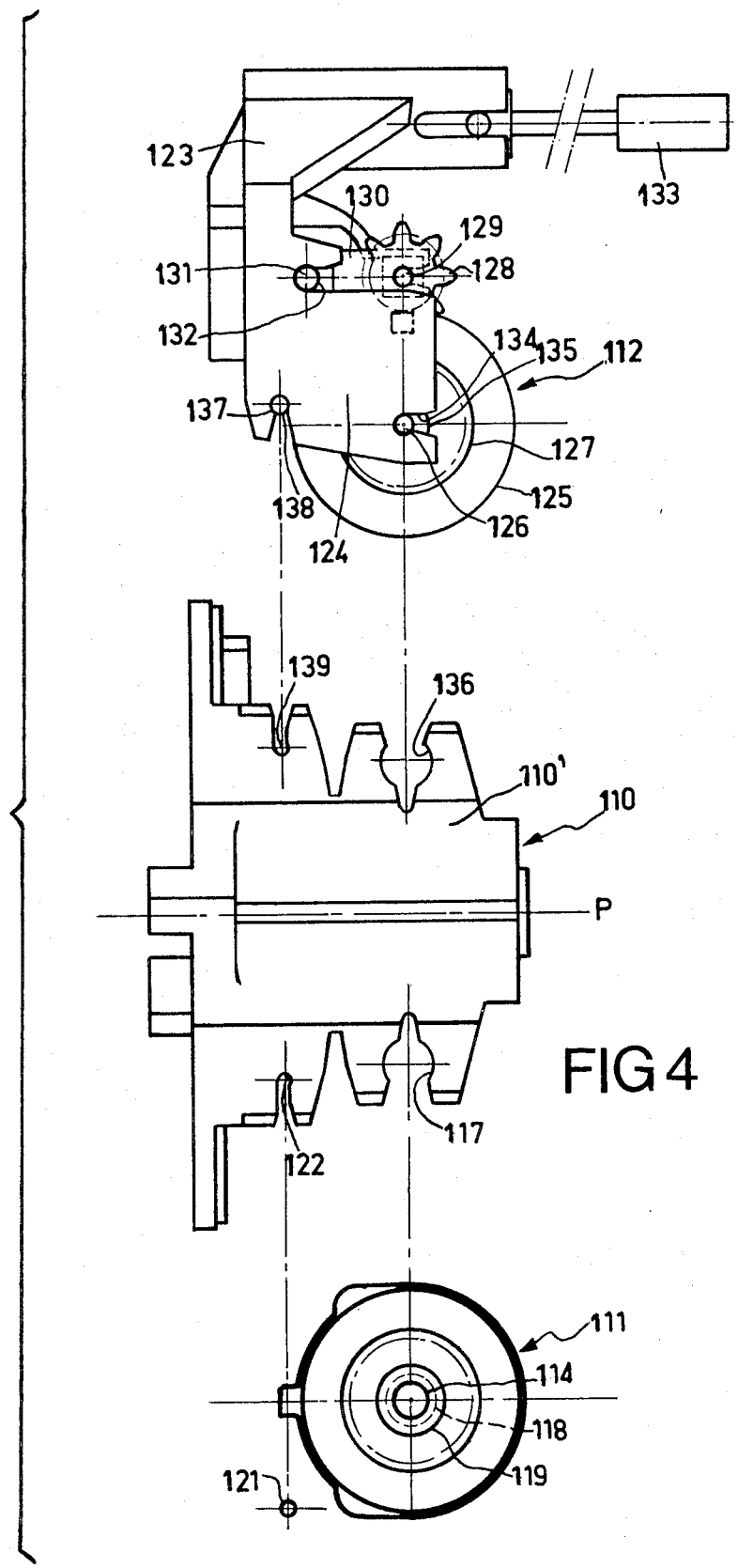
FIG. 4 is an exploded side view of a mileage recording mechanism in a modified embodiment.

FIG. 4 concerns a modified embodiment in which the mileage recording unit 111 is identical to the unit 20 of FIGS. 1 to 3, whilst the trip-dial unit 112 presents a structure quite different from that of the unit 30 of FIGS. 1 to 3.

Concerning the unit 111, it will simply be noted that the end 114 of the shaft of the drums, visible in FIG. 4, comprises a part 118 followed by a flange 119 of larger diameter, and that this part 118 is received in a recess 117 formed in each of the walls 110' of the frame 110. The immobilization of the unit is achieved as described hereinabove with the aid of the locking rod 121 which is force-fitted in the recesses 122 formed in the frame.

The trip-dial unit 112 comprises a chassis 123 between the walls 124 of which are disposed a series of drums 125 mounted on a common shaft of which one end formed as a journal 126 is seen. The drive of the first drum is obtained by means of the gear 127 and the drive between the drums is achieved by a series of outer gears 128 mounted on a common shaft 129 and each disposed between two adjacent drums. The shaft 129 is fixed to a lever 130 pivotally mounted on a shaft 131, force-fitted in recesses 132 formed in the walls 124.

The resetting to zero of the trip-dial is effected with the aid of a push button 133 and uses, in known manner, a comb-shaped element, of which each tooth acts on a heart-shaped cam associated with each drum. In addition, the action on the push button causes the pivoting of the lever 130 and therefore of the gears 128, so as to place out of engagement the gears 128 and the drums 125 and to allow the resetting.

The journals 126 of the shaft of the drums are force-fitted in recesses 134, formed in the walls of the chassis. The intermediate part 135 between the journal 126 and the gear 127 has the same diameter as the part 118 of the mileage recording unit, and is thus fitted in a recess 136 of the frame identical to the recess 117 and symmetrical thereto with respect to a plane P, indicated in mixed lines. It should be noted here that the recess 134 of the chassis is oriented perpendicularly to the recess 136 of the frame. This facilitates a possible dismantling of the trip-dial unit as, when a traction is exerted on the chassis 123 to detach it from the frame 110, the ends 126 of the shaft of the drums are detached with the chassis and there is no risk that they remain attached to the frame 110.

The chassis 123 also carries rods 137 fixed in any manner, for example force-fitted in recesses 138 of the same diameter as the rod 121, and which are mounted in recesses 139 identical to recesses 122.

It should be noted that, in the assembled state, the walls 124 of the chassis 123 are placed outside the walls 110' of the frame 110. In addition, the chassis 123 bears on its wall connecting the parallel walls 124, tongues of ribs which engage elements of corresponding shape provided on the frame 110 to ensure a precise centering of the chassis 123 with respect to the frame 110 during assembly.

It is seen that, despite the very different structures of the mileage recording unit 111 and the trip-dial unit 112, the frame 110 conserves in this modified embodiment an almost exactly symmetrical form.

What is claimed is:

1. An odometer for displaying the speed of a vehicle and the distance travelled, comprising an input shaft driven at a speed proportional to that of the vehicle, a speedometer unit connected to the input shaft, a mileage recording unit comprising a plurality of graduated drums mounted side by side on a common shaft and driven from the input shaft, a plurality of radially projecting stop lugs, and a frame for supporting said unit in rotation, characterized in that:
(a) the frame comprises two parallel walls provided with recesses for receiving the respective ends of the shaft of the mileage recording unit,
(b) wherein the frame comprises a bar extending between said walls parallel to said common shaft and providing stop means for the projecting stop lugs, and
(c) a locking element associated with the bar for immobilizing the stop lugs in their stop position, said element being force-fitted in recesses formed in said walls of the frame substantially in the plane of the bar.

2. An odometer according to claim 1, also including a trip-dial unit having a plurality of drums mounted side by side in a chassis, and a line of outer gears pivotally mounted on the chassis for driving the drums, and journals provided at both ends of the line of drums, characterized in that:
(d) said chassis is provided with recesses to receive the journals,
(e) said chassis having at least one element force-fitted in recesses formed in the walls of the frame, and
(f) said journals also are mounted in recesses formed in said walls.

3. An odometer according to claim 2, wherein the recesses formed in the chassis to receive the journals are oriented perpendicularly to those formed in the frame.

4. An odometer according to claim 2, wherein the frame and the chassis comprise elements which cooperate to provide centering of the chassis.

5. An odometer according to claim 1, wherein the speedometer unit comprises a magnet rotatable with the input shaft, an induced ring, a shaft rotatable with the induced ring to display the speed and a coiled spring mounted on the shaft and which opposes the movement of the ring, characterized in that the turns of the coiled spring are normally close wound and move apart in operation.

* * * * *